US011182624B2

(12) United States Patent
Zhang et al.

(10) Patent No.: US 11,182,624 B2
(45) Date of Patent: Nov. 23, 2021

(54) METHOD, SYSTEM AND MEMORY FOR CONSTRUCTING TRANSVERSE TOPOLOGICAL RELATIONSHIP OF LANES IN HIGH-DEFINITION MAP

(71) Applicant: WUHHAN KOTEL BIG DATE CORPORATION, Hubei (CN)

(72) Inventors: Cheng Zhang, Wuhan (CN); Xiaoyan Liu, Wuhan (CN); Fen Liu, Wuhan (CN)

(73) Assignee: WUHHAN KOTEL BIG DATE CORPORATION, Wuhan (CN)

( * ) Notice: Subject to any disclaimer, the term of this patent is extended or adjusted under 35 U.S.C. 154(b) by 187 days.

(21) Appl. No.: 16/702,700

(22) Filed: Dec. 4, 2019

(65) Prior Publication Data
US 2020/0117922 A1 Apr. 16, 2020

Related U.S. Application Data

(63) Continuation of application No. PCT/CN2019/082325, filed on Apr. 11, 2019.

(30) Foreign Application Priority Data

Aug. 6, 2018 (CN) .......................... 201810887601.7

(51) Int. Cl.
*G06K 9/00* (2006.01)
*B60W 30/12* (2020.01)
(Continued)

(52) U.S. Cl.
CPC ......... *G06K 9/00798* (2013.01); *B60W 30/12* (2013.01); *G01C 21/32* (2013.01); *G01C 21/3446* (2013.01); *G08G 1/167* (2013.01)

(58) Field of Classification Search
CPC ............ G06K 9/00798; G06K 9/4638; G06K 9/4604; G06T 2207/30256; G06T 7/10;
(Continued)

(56) References Cited

U.S. PATENT DOCUMENTS 5,778,333 A 7/1998 Koizumi
10,147,315 B2 12/2018 Fowe
(Continued)

FOREIGN PATENT DOCUMENTS

AU 2017254915 A1 7/2018
CN 101162154 A 4/2008
(Continued)

OTHER PUBLICATIONS

International Search Report in the international application No. PCT/CN2019/082325, dated Jul. 24, 2019.

*Primary Examiner* — Kenneth J Malkowski
(74) *Attorney, Agent, or Firm* — Pattao, LLC; Junjie Feng

(57) ABSTRACT

A method and system for constructing a transverse topological relationship and a memory are provided. In the method, lane group data in a high-definition map is acquired; for each lane group, a shared boundary line group of two adjacent lanes is sequentially extracted, and the number of parallel boundary line elements is determined; if the number is 1, a transverse topological relationship between the two adjacent lanes is not generated, otherwise the number and types of boundary line units on the parallel boundary line elements are determined; and if the number of the boundary line units is 1, the transverse topological relationship between the two adjacent lanes is generated, otherwise segmentation processing is performed on the lane group along a lane direction, and the transverse topological relationship between two adjacent lanes in each of segments,
(Continued)

which are obtained by the segmentation processing on the lane group, is sequentially generated.

18 Claims, 13 Drawing Sheets

(51) Int. Cl.
  *G01C 21/32* (2006.01)
  *G01C 21/34* (2006.01)
  *G08G 1/16* (2006.01)

(58) Field of Classification Search
  CPC ..... G06T 7/11; G06T 7/13; G06T 7/12; G06T 9/20; B60W 30/12; G01C 21/32; G01C 21/3446; G08G 1/167
  See application file for complete search history.

(56) References Cited

U.S. PATENT DOCUMENTS

2016/0167582 A1* 6/2016 Chen ................ G01C 21/32
                                                              348/148
2018/0033297 A1   2/2018  Fowe
2018/0188059 A1   7/2018  Wheeler et al.
2018/0188060 A1   7/2018  Wheeler et al.
2018/0189578 A1   7/2018  Yang et al.
2018/0204073 A1*  7/2018  Kawano ................ G06T 7/74
2019/0095722 A1*  3/2019  Kang ................... G06T 7/215
2019/0251845 A1*  8/2019  Kosaka ................ G06K 9/036
2019/0266418 A1*  8/2019  Xu ..................... G06K 9/4604

FOREIGN PATENT DOCUMENTS

| | | |
|---|---|---|
| CN | 105675000 A | 6/2016 |
| CN | 105718860 A | 6/2016 |
| CN | 106980657 A | 7/2017 |
| CN | 107764263 A | 3/2018 |
| CN | 108036794 A | 5/2018 |
| CN | 108088448 A | 5/2018 |
| CN | 108151751 A | 6/2018 |
| CN | 108241712 A | 7/2018 |
| CN | 108871368 A | 11/2018 |
| JP | 2018109534 A | 7/2018 |
| WO | 2018126228 A1 | 7/2018 |

* cited by examiner

METHOD, SYSTEM AND MEMORY FOR CONSTRUCTING TRANSVERSE TOPOLOGICAL RELATIONSHIP OF LANES IN HIGH-DEFINITION MAP

CROSS-REFERENCE TO RELATED APPLICATIONS

This is a continuation application of International Patent Application No. PCT/CN2019/082325, filed on Apr. 1, 2019, the contents of which are hereby incorporated by reference in its entirety.

TECHNICAL FIELD

The disclosure relates to the technical fields of high-definition map navigation and data processing, and more particularly, to a method, system and memory for constructing a topological network of lanes in a high-definition map.

BACKGROUND

A high-definition map, as an important support to development of self-driving cars, plays an important role in the aspects of transverse/longitudinal accurate positioning, path planning, intelligent speed regulation, steering and the like. However, present high-definition map-based path planning is implemented based on roads and has the advantage of capability in long-distance road calculation and the shortcoming that a specific lane may not be determined under local route planning, and thus a route guide is not so accurate.

Therefore, there is an urgent need in related researches on self-driving for a lane-level-based path planning algorithm capable of implementing fast topological calculation to improve detailed local route planning and provide an accurate route guide.

SUMMARY

Explanations about related terms:

1: High-definition lane group

It is used to completely describe a set of lanes in the same region on a road and with the same running direction, as illustrated in FIG. 2.

2: Lane number

It is used to completely describe a number sequence of lanes in a lane group. The lanes are sequentially numbered from 0 from the roadside to the middle of a road according to a traffic direction of the road.

3: High-definition lane centerline shape coordinate point

A lane centerline is an imaginary line located in middle of a lane and configured to describe a shape of the lane. Each point in a shape coordinate point set of the lane centerline is required to have X and Y coordinates. The X and Y coordinates may be latitude and longitude coordinates under a spherical coordinate system and may also be X and Y coordinates of a rectangular coordinate system under a projected coordinate system, as illustrated in FIG. 6.

4: High-definition lane centerline node coordinate

It is used to describe a connection relationship of lanes between two lane groups sharing a lane group boundary. A node of a lane centerline is required to have X and Y coordinates. The X and Y coordinates may be latitude and longitude coordinates under a spherical coordinate system and may also be X and Y coordinates of a rectangular coordinate system under a projected coordinate system, as illustrated in FIG. 2.

5: High-definition lane boundary line shape coordinate point

It is used to completely describe a set of points required by a lane boundary line. Each point is required to have X and Y coordinates. The X and Y coordinates may be latitude and longitude coordinates under a spherical coordinate system and may also be X and Y coordinates of a rectangular coordinate system under a projected coordinate system, as illustrated in FIG. 6.

6: High-definition lane boundary line group

It is used to completely describe a set of boundary lines of different types on the same sides of a lane. Each boundary line set consists of one or more parallel boundary line elements configured to describe lane boundary line attributes, and each parallel boundary line element consists of one or more boundary line units which are sequentially arranged and have different attributes. As illustrated in FIG. 3, there are totally three lane boundary line groups in a lane group; the lane boundary line group 0 includes two parallel boundary line elements of which each element has only one unit; and each of the lane boundary line group 1 and the lane boundary line group 2 includes only one parallel boundary line element, and the parallel boundary line element in the boundary line group 1 consists of three boundary line units.

7: Lane boundary line number

It is used to completely describe number sequences of lane boundary line groups and parallel boundary line elements therein. The lane boundary lines are sequentially numbered from 0 from the roadside to the middle of a road according to a traffic direction of the road. The parallel boundary line elements in each lane boundary line group are sequentially numbered from 0 from the roadside to the inner side of the road.

8: Shared boundary line group

It is used to describe a set of boundary lines separating two adjacent lanes.

9: Boundary line unit

It is used to completely describe attributes of boundary lines with different attributes on a high-definition lane boundary line. A lane boundary line may be divided into multiple segments according to different attributes (for example, colors and materials), and each segment of the boundary line is called a boundary line unit.

10: Solid and dotted lane boundary line change

It is used to describe a changing condition of a lane changing strategy for vehicles on a lane boundary line. For example, if a certain segment on the lane boundary line is a single solid line, it is indicated that a vehicle is not allowed to run across the segment of the boundary line for lane changing in a region of the segment. If a certain segment of the boundary line is a single dotted line, a vehicle may run across the segment of the boundary line to change the lane to an adjacent lane.

For the technical problem in a conventional art, the disclosure provides a method and system for constructing a transverse topological relationship of lanes in a high-definition map and a memory. A transverse topological relationship between two adjacent lanes in a lane group is constructed within an acceptable accuracy requirement range, and is applied to lane-level path guiding to implement fast topological calculation and greatly improve path planning efficiency.

The technical problem is solved in the disclosure through the following technical solutions.

According to an aspect, the disclosure provides a method for constructing a transverse topological relationship of lanes in a high-definition map, which may include the following steps.

Data of lane groups is acquired from the high-definition map.

For each lane group, a shared boundary line group of two adjacent lanes is sequentially extracted, and the number of parallel boundary line elements in the shared boundary line group is determined.

If the number of the parallel boundary line elements is 1, a transverse topological relationship between the two adjacent lanes is not generated.

Otherwise the number and types of boundary line units on the parallel boundary line elements are determined.

If the number of the boundary line units is 1, the transverse topological relationship between the two adjacent lanes is generated according to a type of a shared boundary line.

Otherwise segmentation processing is performed on the lane group along a lane direction according to a point, where switching between a solid line and a dotted line occurs, of the shared boundary line, and the transverse topological relationship between two adjacent lanes in each of segments, which are obtained by the segmentation processing on the lane group, is sequentially generated according to a position of the point where switching between the solid line and dotted line occurs and the types of the boundary line units.

The data of lane groups in the high-definition map includes lane centerline data configured to describe lane information and lane boundary line data configured to describe a geometric shape and attribute of a boundary line.

The lane centerline data includes coordinate point data configured to describe a lane connecting line shape and numbers of a starting node and termination node of a lane centerline, and the lane boundary line data includes coordinate point data configured to describe a boundary line shape and a start-end range of each boundary line unit on each boundary line.

The coordinate point data includes a spherical coordinate or a projected coordinate.

Furthermore, after the operation that the data of lane groups is acquired from the high-definition map, the method further includes that a lane group set is filtered to acquire lane group data, including lane boundary line information, of more than one lane.

Furthermore, the operation that segmentation processing is performed on the lane group along the lane direction according to the point where switching between the solid line and dotted line occurs of the shared boundary line may include the following operations.

If a previous boundary line unit of the point where switching between the solid line and dotted line occurs of the shared boundary line is $B_1$, a distance dis between an ending point A of the boundary line unit $B_1$ and a starting point S of a shared boundary line L is acquired from the lane group data, the distance dis being an accumulated sum of shape point line segments between the point S and the point A.

Shape coordinate points of the shared boundary line L are acquired, and assuming a set of the vectorized coordinate points of the shared boundary line is $\{P_1, P_2, P_3 \ldots P_n\}$, every two adjacent coordinate points form a line segment to obtain line segments $L_1\{P_1, P_2\}$, $L_2\{P_2, P_3\}$, $L_3\{P_3, P_4\}$ ... line segment $L_{n-1}\{P_{n-1}, P_n\}$, and lengths $len_1$, $len_2$, $len_3$, ... $len_{n-1}$ of the line segments are calculated.

The specific line segment, where the ending point A is located, in a line segment set $L_1, L_2, L_3, \ldots L_{n-1}$ is calculated according to the distance dis and the lengths $len_1$, $len_2$, $len_3$, ... $len_{n-1}$ of the line segments, A being denoted as located on a line segment $L_a$ and a starting point of $L_a$ being denoted as B.

A distance between the ending point A and B is calculated, and a position of the point A on the line segment $L_a$ is calculated according to the distance to acquire a coordinate of the point A.

The point A and the point B form a line segment $L_{AB}$, a perpendicular line $V_A$, that passes through the point A, of the line segment $L_{AB}$ is drawn, and cutting processing is performed on the lane group by use of the perpendicular line $V_A$.

The steps are repeated to cut the lane group into multiple segments along the lane direction according to shared boundary line units.

Furthermore, after the operation that cutting processing is performed on the lane group along the lane direction, the method may further include that intersection points of the perpendicular line $V_A$ and each of a lane centerline $C_L$ on the left of the shared boundary line L and a lane centerline $C_R$ on the right of L are calculated.

Furthermore, the operation that the intersection points of the perpendicular line $V_A$ and each of the lane centerline $C_L$ on the left of the shared boundary line L and the lane centerline $C_R$ on the right of L are calculated may include the following operations.

Shape coordinate points of the lane centerline $C_R$ on the right of the shared boundary line L are acquired, and assuming a set of the vectorized coordinate points of the lane centerline $C_R$ is $\{P_1', P_2', P_3' \ldots P_n'\}$, every two adjacent coordinate points form a line segment to obtain line segments $L_1'\{P_1', P_2'\}$, $L_2'\{P_2', P_3'\}$, $L_3'\{P_3', P_4'\}$ ... line segment $L_{n-1}'\{P_{n-1}', P_n'\}$.

Whether the perpendicular line $V_A$ is intersected with a line segment set $\{L_1', L_2', L_3' \ldots L_{n-1}'\}$ or not is determined, and an intersection point is calculated, if there is more than one intersection point, the intersection point closest to the point A is extracted and is denoted as a point C.

It is assumed that the lane centerline on the left of the shared boundary line L is $C_L$, the steps are repeated to calculate an intersection point D between the perpendicular line $V_A$ and $C_L$.

Furthermore, the operation that the transverse topological relationship between two adjacent lanes in each of segments, which are obtained by the segmentation processing on the lane group, is sequentially generated according to the position of the point where switching between the solid line and dotted line occurs and the types of the boundary line unit may include the following operations.

For a point A where switching between a solid line and a dotted line occurs, a position of the point where the switching occurs is determined at first.

If the point A is the first point of points where switching between a solid line and a dotted line occurs on the shared boundary line, a starting point of the lane centerline $C_R$ on the right is denoted as $S_R$ and a starting point of the lane centerline $C_L$ on the left is denoted as $S_L$, topological relationships between the point $S_R$ and the point D and between the point $S_L$ and the point C are generated according to the type of the boundary line unit $B_1$.

If the point A is not the first point of points where switching between a solid line and a dotted line occurs on the shared boundary line, a topological relationship between an intersection point $C^{-1}$ of a perpendicular line $V_A^{-1}$ and the lane centerline $C_R$ on the right and the intersection point D of the perpendicular line $V_A$ and the lane centerline $C_L$ on the left and a topological relationship between an intersection point $D^{-1}$ of the perpendicular line $V_A^{-1}$ and the lane centerline $C_L$ on the left and the intersection point C of the perpendicular line $V_A$ and the lane centerline $C_R$ on the right are generated according to the type of the boundary line unit $B_1$, $V_A^{-1}$ being a perpendicular line passing through a point, where switching between a solid line and a dotted line occurs and which is previous to the point A, and $V_A$ being a perpendicular line passing through the point A.

If the point A is the last point where switching between a solid line and a dotted line occurs on the shared boundary line, a boundary line unit next to the point A is recorded as $B_2$, a terminal point of the lane centerline $C_R$ on the right is $E_R$ and the starting point of the lane centerline $C_L$ on the left is $E_L$, a topological relationship between the intersection point C of the perpendicular line $V_A$ and the lane centerline $C_R$ on the right and the point $E_L$ and a topological relationship between the intersection point D of the perpendicular line $V_A$ and the lane centerline $C_L$ on the left and the point $E_R$ are generated according to a type of the boundary line unit $B_2$.

Furthermore, the operation that the transverse topological relationship between the two adjacent lanes in each segment of the lane group is generated may include the following operations.

(1) If the boundary line unit $B_1$ is blank, namely there is no lane line or $B_1$ is a dotted line, a transverse topological relationship that lane changing is allowed in the two lanes in a cutting region is generated.

(2) If the boundary line unit $B_1$ is dotted on the left and solid on the right, a transverse topological relationship of changing from the left lane to the right lane in the cutting region is generated.

(3) If the boundary line unit $B_1$ is solid on the left and dotted on the right, a transverse topological relationship of changing from the right lane to the left lane in the cutting region is generated.

(4) Under circumstance except for the three circumstances, the transverse topological relationship between the two lanes in the cutting region is not generated.

According to another aspect, the disclosure provides a system for constructing a transverse topological relationship of lanes in a high-definition map, which may include a data acquisition module, a boundary line unit determination module and a topological relationship generation module.

The data acquisition module may be configured to acquire lane group data in the high-definition map.

The boundary line unit determination module may be configured to, for each lane group, sequentially extract a shared boundary line group of two adjacent lanes and determine the number of shared parallel boundary line elements and the number and types of boundary line units.

The topological relationship generation module may be configured to generate a transverse topological relationship between the two adjacent lanes, when the number of the parallel boundary line elements of a shared boundary line group is more than 1, not generate the transverse topological relationship between the two adjacent lanes, when the number of the parallel boundary line elements of the shared boundary line group is 1 and if the number of the units of the parallel boundary line element is 1, directly generate the transverse topological relationship between the two adjacent lanes according to a type of a shared boundary line, otherwise perform segmentation processing on the lane group along a lane direction according to a point, where switching between a solid line and a dotted line occurs, of the shared boundary line and sequentially generate the transverse topological relationship between two adjacent lanes in each of segments, which are obtained by the segmentation processing on the lane group, according to the types of the boundary line units.

Furthermore, the topological relationship generation module may include a segmentation processing module, configured to:

if a previous boundary line unit of the point where switching between the solid line and dotted line occurs of the shared boundary line is $B_1$, acquire a distance dis between an ending point A of the boundary line unit $B_1$ and a starting point S of the shared boundary line L from the lane group data, the distance dis being an accumulated sum of shape point line segments between the point S and the point A;

acquire shape coordinate points of the shared boundary line L, and assuming a set of the vectorized coordinate points of the shared boundary line is $\{P_1, P_2, P_3 \ldots P_n\}$, form, by every two adjacent coordinate points, a line segment to obtain line segments $L_1\{P_1, P_2\}$, $L_2\{P_2, P_3\}$, $L_3\{P_3, P_4\} \ldots$ line segment $L_{n-1}\{P_{n-1}, P_n\}$ and calculate lengths $len_1$, $len_2$, $len_3$, $\ldots len_{n-1}$ of the line segments;

calculate a specific line segment, where the ending point A is located, in a line segment set $L_1, L_2, L_3, \ldots L_{n-1}$ according to the distance dis and the lengths $len_1$, $len_2$, $len_3$, $\ldots len_{n-1}$ of the line segments, A being denoted as located on a line segment $L_a$ and a starting point of $L_a$ being denoted as B;

calculate a distance between the ending point A and B and calculate a position of the point A on the line segment $L_a$ according to the distance to acquire a coordinate of the point A;

form, by the point A and the point B, a line segment $L_{AB}$, draw a perpendicular line $V_A$, that passes through the point A, of the line segment $L_{AB}$ and perform cutting processing on the lane group by use of the perpendicular line $V_A$; and repeat the steps to cut the lane group into multiple segments along the lane direction according to shared boundary line units.

Furthermore, the topological relationship generation module may further include an intersection point calculation module, configured to calculate intersection points of the perpendicular line $V_A$ and each of a lane centerline $C_L$ on the left of a shared boundary line L and a lane centerline $C_R$ on the right of L.

According to a third aspect, the disclosure also provides a memory, which may store a computer program configured to implement the method for constructing the transverse topological relationship of the lines in the high-definition map.

DETAILED DESCRIPTION

The principle and characteristics of the disclosure will be described below in combination with the drawings. The listed examples are only adopted to explain the disclosure and not intended to limit the scope of the disclosure.

Figure 1:
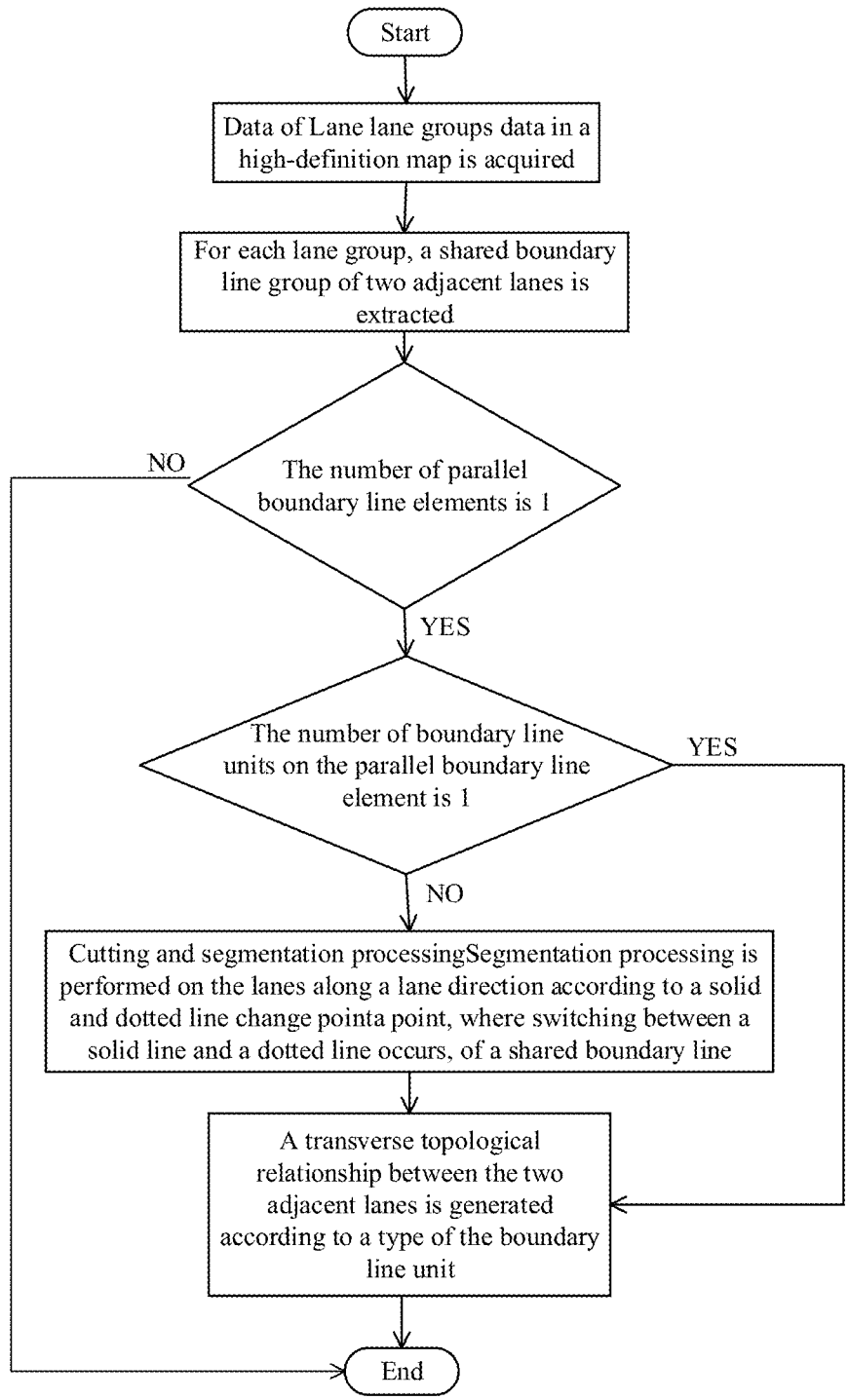
FIG. 1 is a processing flowchart according to an embodiment of the disclosure.

FIG. 1 is a flowchart of a method for constructing a transverse topological relationship of lanes in a high-definition map according to an embodiment of the disclosure. The following steps are included.

In 1, lane group data in a high-definition map is read, and after the data is read, it is necessary to ensure correctness of numbers of lanes in each lane group and ensure consistency between an arrangement sequence of the lanes and the real world.

Figure 2:
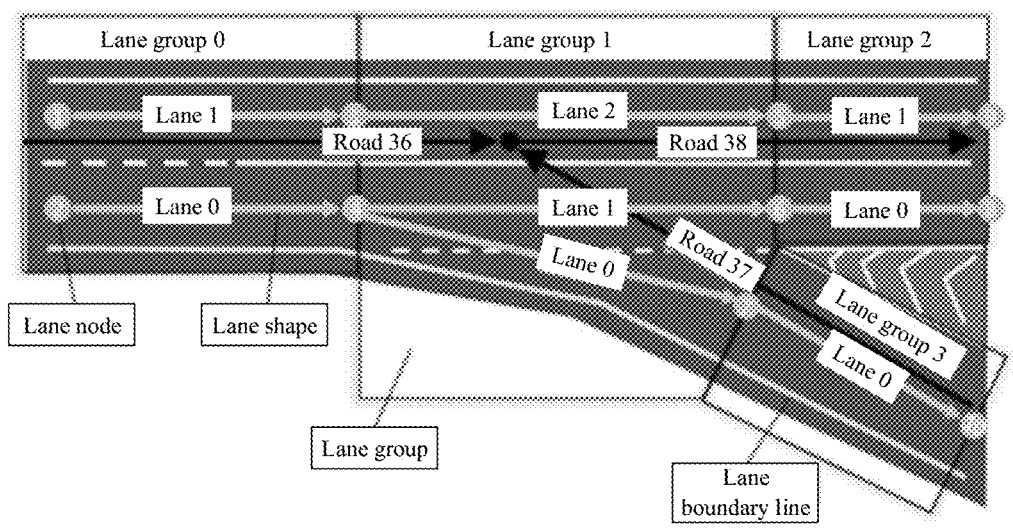
FIG. 2 is an illustration diagram of high-definition roads, lane groups, lane shapes, lane nodes and a lane boundary line according to an embodiment of the disclosure.

In 2, a read high-definition lane group set is filtered to acquire lane group data, including lane boundary line shape point information, of more than one lane. In a few lane groups illustrated in FIG. 2, the lane group 3 includes only one lane, and the lane group may be filtered.

In 3, a transverse topological relationship between adjacent lanes in the same lane group is generated.

In (3.1), a shared boundary line group of the two adjacent lanes is acquired.

In (3.2), if the number of parallel boundary line elements in the shared boundary line group is not 1, the transverse topological relationship between the two lanes is not generated, otherwise Step (3.3) is executed.

In (3.3), if the number of units of the parallel boundary line element is 1, cutting is not required and the lane changing topological relationship between the two lanes is generated according to a type of a boundary line; and if the number of the units is more than 1, Step (3.4) is executed.

In (3.4), two adjacent boundary line units on a lane boundary line are extracted, whether they form switching between a solid line and a dotted line is determined, and if YES, cutting is performed by use of a cutting algorithm to obtain a perpendicular line, recorded as $V_A$, at a position where switching between a solid line and a dotted line occurs.

Figure 3:
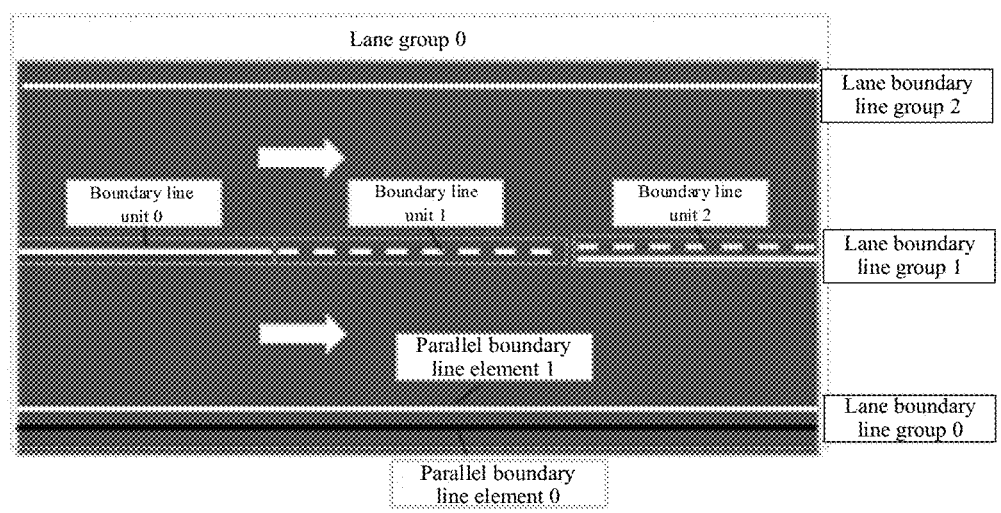
FIG. 3 is an illustration diagram of lane boundary line groups and lane boundary line units according to an embodiment of the disclosure.
Figure 4:
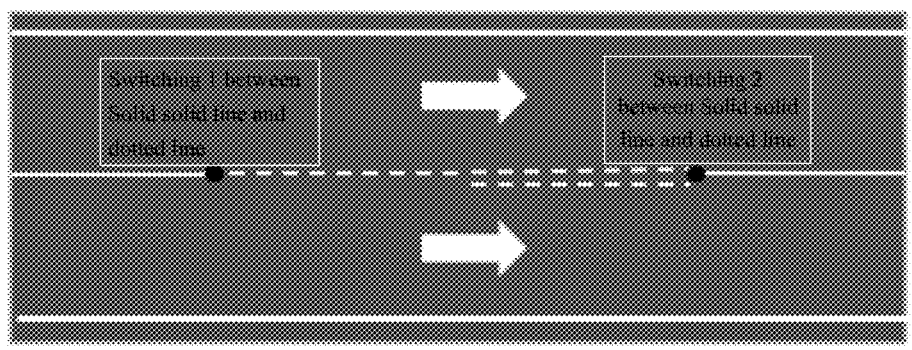
FIG. 4 is an illustration diagram of switching between a solid line and a dotted line of a lane boundary line unit according to an embodiment of the disclosure.

As illustrated in FIG. 3, a boundary line unit 0 is a single solid line, a boundary line unit 1 is a single dotted line and a boundary line unit 2 is dotted on the left and solid on the right. In such case, the boundary line unit 0 and the boundary line unit 1 form switching between a solid line and a dotted line, the boundary line unit 1 and the boundary line unit 2 also form switching between a solid line and a dotted line, and they are all required to be cut.

The cutting algorithm includes the following steps.

Figure 5:
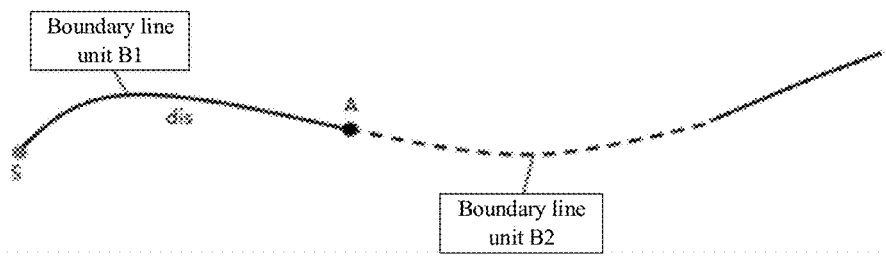
FIG. 5 is an illustration diagram of a distance between an ending point of a boundary line unit and a starting point of a lane boundary line according to an embodiment of the disclosure.

In ①, if a previous boundary line unit of the position where switching between a solid line and a dotted line occurs of the lane boundary line is $B_1$ and a next boundary line unit is $B_2$, a distance dis between an ending point A of the boundary line unit $B_1$ and a starting point S of a shared boundary line L is acquired from the lane group data (dis is an accumulated distance sum of shape point line segments between the point S and the point A), as illustrated in FIG. 5.

Figure 6:
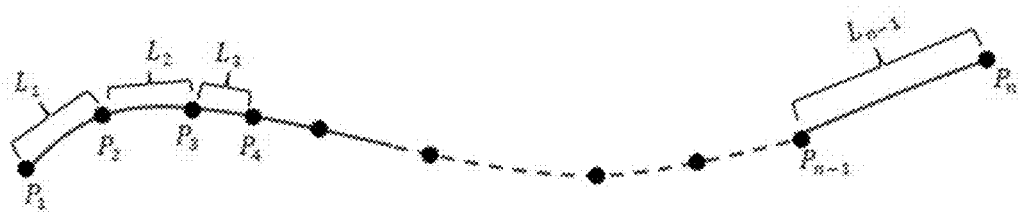
FIG. 6 is an illustration diagram of a set of vectorized coordinate points of a shared lane boundary line according to an embodiment of the disclosure.

In ②, shape coordinate points of the shared boundary line L are acquired, and assuming a set of the vectorized coordinate points of the shared boundary line is $\{P_1, P_2, P_3 \ldots P_n\}$, every two adjacent coordinate points form a line segment to obtain line segments $L_1\{P_1, P_2\}$, $L_2\{P_2, P_3\}$, $L_3\{P_3, P_4\} \ldots$ line segment $L_{n-1}\{P_{n-1}, P_n\}$ and lengths $len_1$, $len_2$, $len_3$, ... $len_{n-1}$ of the line segments are calculated, as illustrated in FIG. 6.

In ③, the specific line segment, where the ending point A is located, in a line segment set $L_1, L_2, L_3, \ldots L_{n-1}$ is calculated according to the distance dis and $len_1$, $len_2$, $len_3$, ... $len_{n-1}$, A being denoted as located on a line segment $L_a$ and a starting point of $L_a$ being denoted as B.

In ④, a distance between the ending point A and B is calculated, and a position of the point A on the line segment $L_a$ is calculated according to the distance to acquire a coordinate of the point A.

In ⑤, the point A and the point B form a line segment $L_{AB}$, and a perpendicular line $V_A$, that passes through the point A, of the line segment $L_{AB}$ is drawn.

Figure 7:
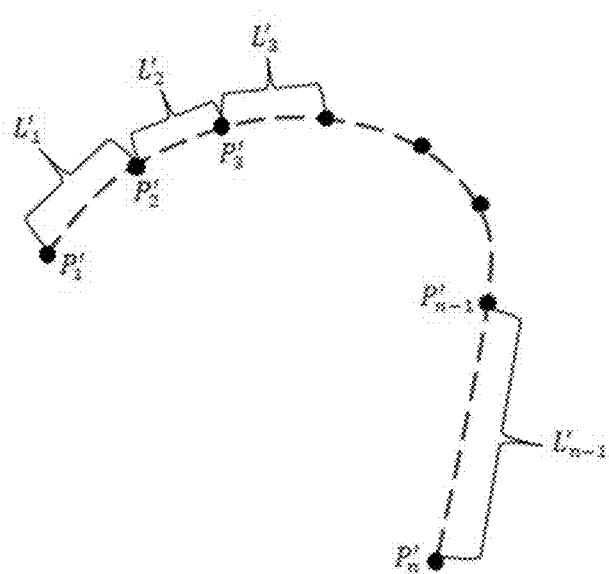
FIG. 7 is an illustration diagram of a set of vectorized coordinate points of a lane centerline according to an embodiment of the disclosure.

In (3.5), shape coordinate points of a lane centerline $C_R$ on the right of the shared boundary line L are acquired, and assuming a set of the vectorized coordinate points of the lane centerline $C_R$ is $\{P_1', P_2', P_3' \ldots P_n'\}$, every two adjacent coordinate points form a line segment to obtain line segments $L_1'\{P_1', P_2'\}$, $L_2'\{P_2', P_3'\}$, $L_3'\{P_3', P_4'\} \ldots$ line segment $L_{n-1}'\{P_{n-1}', P_n'\}$, as illustrated in FIG. 7.

Figure 8:
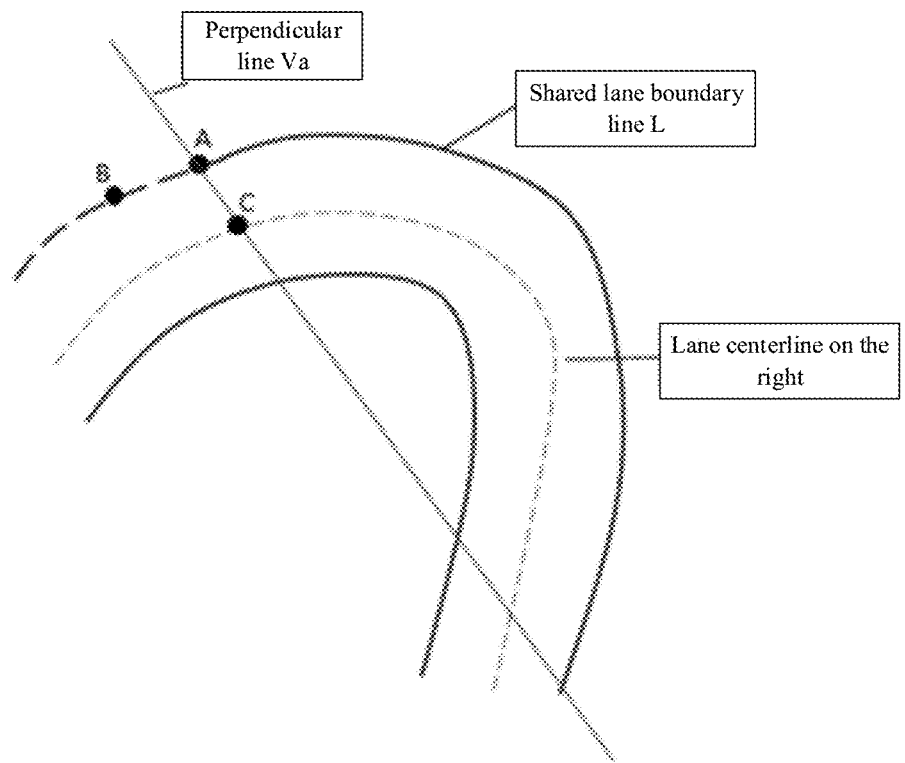
FIG. 8 is an illustration diagram of an intersection point of a perpendicular line and a lane centerline at a position where switching between a solid line and a dotted line occurs of a lane boundary line according to an embodiment of the disclosure.

In (3.6), whether the perpendicular line $V_A$ is intersected with a line segment set $\{L_1', L_2', L_3' \ldots L_{n-1}'\}$ or not is calculated, and an intersection point is calculated, if there is more than one intersection point, the intersection point closest to the point A is extracted and is denoted as a point C, as illustrated in FIG. 8.

Figure 9:
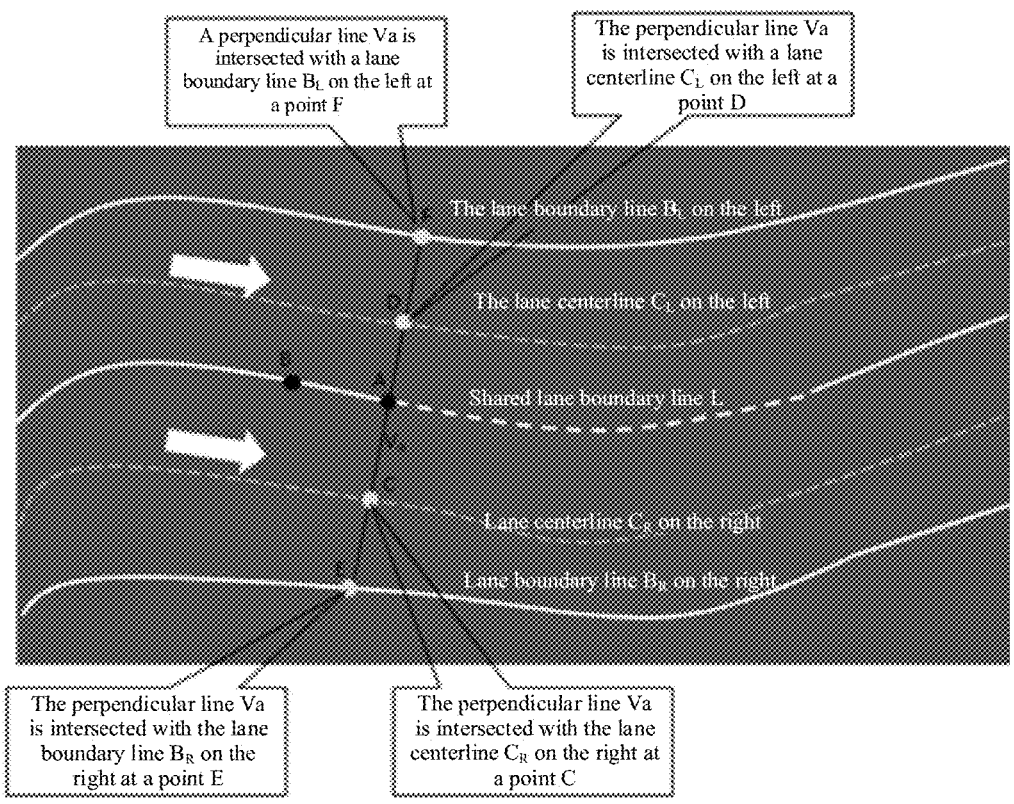
FIG. 9 is an illustration diagram of related intersection points of perpendicular lines and lanes on two sides at a position where switching between a solid line and a dotted line occurs of a shared lane boundary line according to an embodiment of the disclosure.

In (3.7), it is assumed that the lane centerline on the left of the shared boundary line L is $C_L$, a right-side lane centerline of $C_R$ is $B_R$ and a left-side lane boundary line of $C_L$ is $B_L$, Steps (3.4) and (3.5) are repeated to calculate intersection points D, E and F between the perpendicular line $V_A$ and $C_L$, $B_R$ and $B_L$, as illustrated in FIG. 9.

In (3.8), the transverse topological relationship is generated.

Figure 10:
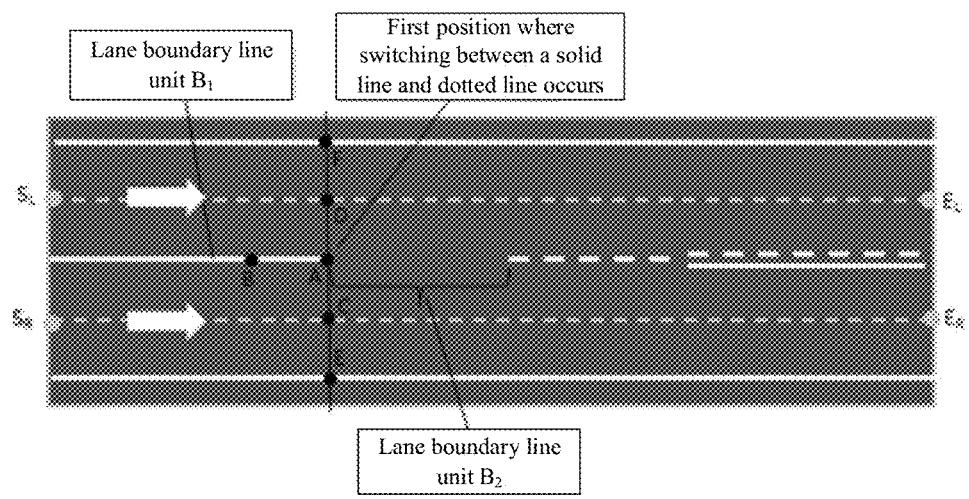
FIG. 10 is an illustration diagram of a transverse topological relationship at the first position where switching between a solid line and a dotted line occurs on a lane boundary line according to an embodiment of the disclosure.

In ①, if $B_1$ and $B_2$ are adjacent boundary line units on two sides of the first position where switching between a solid line and a dotted line occurs on the shared lane boundary line, a starting point of the lane centerline $C_R$ on the right is recorded as $S_R$ and a starting point of the lane centerline $C_L$ on the left is recorded as $S_L$, topological relationships between the point $S_R$ and the point D and between the point $S_L$ and the point C are generated according to a type of the boundary line unit $B_1$, as illustrated in FIG. 10. In FIG. 10, the type of the boundary line unit $B_1$ is a single solid line and a vehicle is not allowed to change the lane, so that the topological relationship between the point $S_R$ and the point D and the topological relationship between the point $S_L$ and the point C are not required to be generated.

Figure 11:
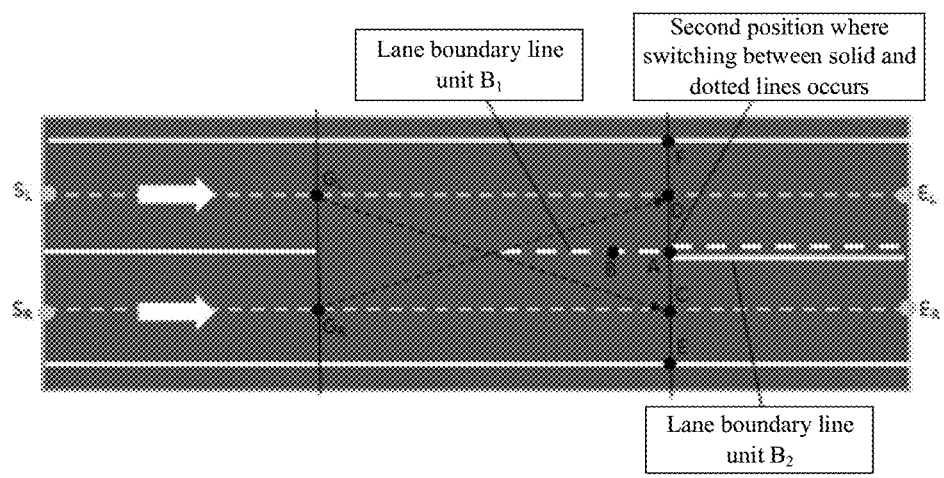
FIG. 11 is an illustration diagram of a transverse topological relationship at the second position where switching between a solid line and a dotted line occurs on a lane boundary line according to an embodiment of the disclosure.

In ②, if $B_1$ and $B_2$ are adjacent boundary line units on the two sides of the first position where switching between a solid line and a dotted line occurs on the shared lane boundary line, an intersection point of the perpendicular line and the lane centerline $C_R$ at a previous position where switching between a solid line and a dotted line occurs is recorded as $G_R$ and an intersection point with the lane centerline $C_L$ is recorded as $G_L$, topological relationships between a point $G_R$ and the point D and between a point $G_L$ and the point C are generated according to the type of the boundary line unit $B_1$, as illustrated in FIG. 11. In FIG. 11, the type of the boundary line unit $B_1$ is a single dotted line and a vehicle is allowed to change the lane, so that the topological relationship between the point $G_R$ and the point D and the topological relationship between the point $G_L$ and the point C are generated, and the vehicle may change the lane from the point $G_R$ of the right lane to the point D of the left lane and may change the lane from the point $G_L$ of the left lane to the point C of the right lane.

Figure 12:
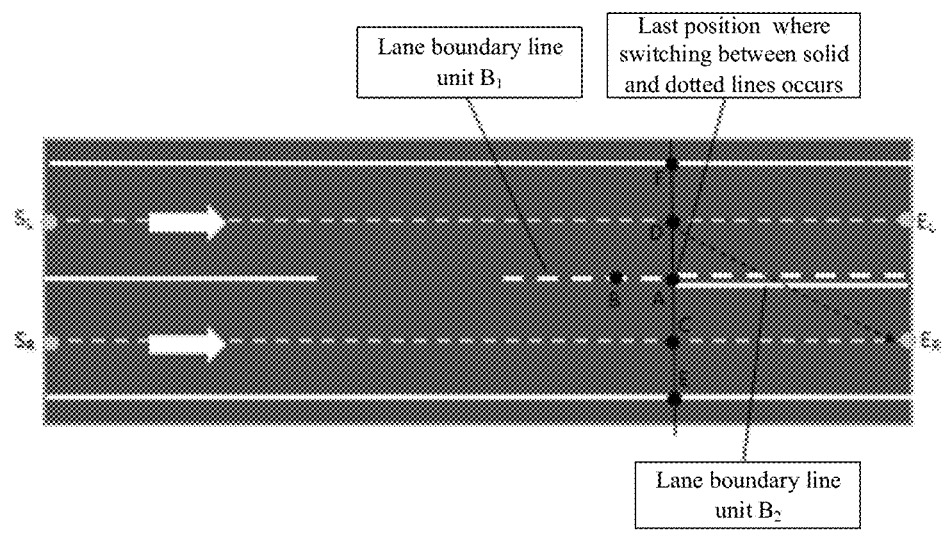
FIG. 12 is an illustration diagram of a transverse topological relationship at the last position where switching between a solid line and a dotted line occurs on a lane boundary line according to an embodiment of the disclosure.

In ③, if $B_1$ and $B_2$ are where the last switching between a solid line and a dotted line occurs on the shared lane boundary line, an ending point of the lane centerline $C_R$ is recorded as $E_R$ and an ending point of the lane centerline $C_L$ is recorded as $E_L$, it is necessary to generate topological relationships between the point C and the point $E_L$ and between the point D and the point $E_R$ according to a type of the boundary line unit $B_2$ as illustrated in FIG. 12. In FIG. 12, the type of the boundary line unit $B_2$ is dotted on the left and solid on the right and a vehicle may change from the left lane to the right lane but may not change from the right lane to the left lane, so that only the topological relationship between the point D and the point $E_R$ is generated.

In (3.9), Step (3.2)-Step (3.8) are repeated to generate transverse topological relationships at all positions where switching between a solid line and a dotted line occurs on the shared lane boundary line.

In ((3.10), Step (3.2)-(3.9) are repeated to generate transverse topological relationships between every two adjacent lanes in the same lane group.

According to the disclosure, a transverse topological relationship between two adjacent lanes at a position where switching between a solid line and a dotted line occurs of a lane boundary line is calculated simply by use of an accumulated sum of lengths of line segments, a relationships between the line segments and a relationship between a line segment and a straight line, thereby simplifying complex lane-level path planning into simple plane-level data calculation problem.

Figure 13:
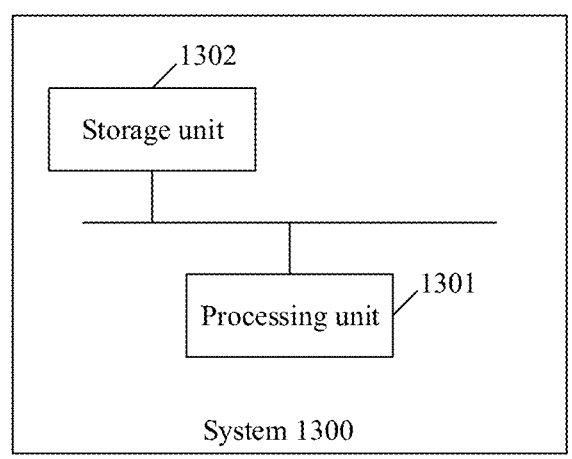
FIG. 13 is a structure diagram of a system according to an embodiment of the disclosure.

Referring to FIG. 13, FIG. 13 is a system 1300 according to an embodiment of the disclosure. The UE 1300 includes a processing unit 1301 and a storage unit 1302.

The processing unit 1301 is configured to execute executable programs stored in the storage unit 1302 to perform steps of:

acquiring data of lane groups from the high-definition map;

for each lane group, sequentially extracting a shared boundary line group of two adjacent lanes and determining the number of parallel boundary line elements in the shared boundary line group;

if the number of the parallel boundary line elements is 1, not generating a transverse topological relationship between the two adjacent lanes;

if the number of the parallel boundary line elements is not 1, determining the number and types of boundary line units on the parallel boundary line elements;

if the number of the boundary line units is 1, generating the transverse topological relationship between the two adjacent lanes according to a type of a shared boundary line; and if the number of the boundary line units is not 1, performing segmentation processing on the lane group along a lane direction according to a point, where switching between a solid line and a dotted line occurs, of the shared boundary line, and sequentially generating the transverse topological relationship between two adjacent lanes in each of segments, which are obtained by the segmentation processing on the lane group, according to a position of the point where switching between the solid line and dotted line occurs and the types of the boundary line units.

The step of performing segmentation processing on the lane group along the lane direction according to the point where switching between the solid line and dotted line occurs of the shared boundary line comprises:

if a previous boundary line unit of the point where switching between the solid line and dotted line occurs of the shared boundary line is $B_1$, acquiring a distance dis between an ending point A of the boundary line unit $B_1$ and a starting point S of a shared boundary line L from the lane group data, the distance dis being an accumulated sum of shape point line segments between the point S and the point A;

acquiring shape coordinate points of the shared boundary line L, and assuming a set of the vectorized coordinate points of the shared boundary line is $\{P_1, P_2, P_3 \ldots P_n\}$, forming, by every two adjacent coordinate points, a line segment to obtain line segments $L_1\{P_1, P_2\}$, $L_2\{P_2, P_3\}$, $L_3\{P_3, P_4\}$ ... line segment $L_{n-1}\{P_{n-1}, P_n\}$ and calculating lengths $len_1$, $len_2$, $len_3$, ... $len_{n-1}$ of the line segments;

calculating a specific line segment, where the ending point A is located, in a line segment set $L_1, L_2, L_3, \ldots L_{n-1}$ according to the distance dis and the lengths $len_1$, $len_2$, $len_3$, ... $len_{n-1}$ of the line segments, A being denoted as located on a line segment $L_a$ and a starting point of $L_a$ being denoted as B;

calculating a distance between the ending point A and B and calculating a position of the point A on the line segment $L_a$ according to the distance to acquire a coordinate of the point A;

forming, by the point A and the point B, a line segment $L_{AB}$, drawing a perpendicular line $V_A$, that passes through the point A, of the line segment $L_{AB}$ and performing cutting processing on the lane group by use of the perpendicular line $V_A$; and repeating the steps to cut the lane group into multiple segments along the lane direction according to shared boundary line units.

After the step of performing cutting processing on the lane group along the lane direction, further comprising: calculating an intersection point of the perpendicular line $V_A$ and a lane centerline $C_L$ on the left of the shared boundary line L, and an intersection point of the perpendicular line $V_A$ and a lane centerline $C_R$ on the right of the shared boundary line L.

The step of calculating the intersection point of the perpendicular line $V_A$ and the lane centerline $C_L$ on the left of the shared boundary line L and the intersection point of the perpendicular line $V_A$ and the lane centerline $C_R$ on the right of L comprises:

acquiring shape coordinate points of the lane centerline $C_R$ on the right of the shared boundary line L, and assuming a set of the vectorized coordinate points of the lane centerline $C_R$ is $\{P_1', P_2', P_3' \ldots P_n'\}$, forming, by every two adjacent coordinate points, a line segment to obtain line segments $L_1'\{P_1', P_2'\}, L_2'\{P_2', P_3'\}, L_3'\{P_3', P_4'\} \ldots$ line segment $L_{n-1}'\{P_{n-1}', P_n'\}$;

determining whether the perpendicular line $V_A$ is intersected with a line segment set $\{L_1', L_2', L_3' \ldots L_{n-1}'\}$ or not, and calculating an intersection point, if there is more than one intersection point, extracting the intersection point closest to the point A, the intersection point being denoted as as a point C; and assuming the lane centerline on the left of the shared boundary line L is $C_L$, repeating the steps to calculate an intersection point D between the perpendicular line $V_A$ and $C_L$.

The step of sequentially generating the transverse topological relationship between two adjacent lanes in each of segments, which are obtained by the segmentation processing on the lane group, according to the position of the point where switching between the solid line and dotted line occurs and the types of the boundary line unit comprises:

for a point A where switching between a solid line and a dotted line occurs, determining a position of the point where the switching occurs at first;

if the point A is the first point of points where switching between a solid line and a dotted line occurs on the shared boundary line, a starting point of the lane centerline $C_R$ on the right being denoted as $S_R$ and a starting point of the lane centerline $C_L$ on the left being denoted as $S_L$, generating topological relationships between the point $S_R$ and the point D and between the point $S_L$ and the point C according to the type of the boundary line unit $B_1$;

if the point A is not the first point of points where switching between a solid line and a dotted line occurs on the shared boundary line, generating a topological relationship between an intersection point $C^{-1}$ of a perpendicular line $V_A^{-1}$ and the lane centerline $C_R$ on the right and the intersection point D of the perpendicular line $V_A$ and the lane centerline $C_L$ on the left and a topological relationship between an intersection point $D^{-1}$ of the perpendicular line $V_A^{-1}$ and the lane centerline $C_L$ on the left and the intersection point C of the perpendicular line $V_A$ and the lane centerline $C_R$ on the right according to the type of the boundary line unit $B_1$, $V_A^{-1}$ being a perpendicular line passing through a point, where switching between a solid line and a dotted line occurs and which is previous to the point A, and $V_A$ being a perpendicular line passing through the point A; and if the point A is the last point where switching between a solid line and a dotted line occurs on the shared boundary line, a boundary line unit next to the point A being denoted as $B_2$, a terminal point of the lane centerline $C_R$ on the right being denoted as $E_R$ and the starting point of the lane centerline $C_L$ on the left being denoted as $E_L$, generating a topological relationship between the intersection point C of the perpendicular line $V_A$ and the lane centerline $C_R$ on the right and the point $E_L$ and a topological relationship between the intersection point D of the perpendicular line $V_A$ and the lane centerline $C_L$ on the left and the point $E_R$ according to a type of the boundary line unit $B_2$.

The step of generating the transverse topological relationship between the two adjacent lanes in each segment of the lane group comprises:

(1) if the boundary line unit $B_1$ is blank, namely there is no lane line or $B_1$ is a dotted line, generating a transverse topological relationship that lane changing is allowed in the two lanes in a cutting region;

(2) if the boundary line unit $B_1$ is dotted on the left and solid on the right, generating a transverse topological relationship of changing from the left lane to the right lane in the cutting region;

(3) if the boundary line unit $B_1$ is solid on the left and dotted on the right, generating a transverse topological relationship of changing from the right lane to the left lane in the cutting region; and (4) under circumstance except for the three circumstances, not generating the transverse topological relationship between the two lanes in the cutting region.

The disclosure has the following beneficial effects. According to the disclosure, a transverse topological relationship between two adjacent lanes at a position where switching between a solid line and a dotted line occurs of a lane boundary line is calculated simply by use of an accumulated sum of lengths of line segments, a relationships between the line segments and a relationship between a line segment and a straight line, thereby simplifying complex lane-level path planning into simple plane-level data calculation problem.

In an exemplary embodiment, the processing unit 1301 may be a processor or a controller (which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination realizing a calculation function (for example, including a combination of one or more microprocessors and a combination of a DSP and a microprocessor. The storage unit 1302 may be a memory.

An embodiment of the disclosure also provides a computer-readable storage medium, which stores a computer program configured for electronic data exchange, the computer program enabling a computer to execute part or all of the operations executed in the abovementioned methods.

An embodiment of the disclosure also provides a computer program product. The computer program product includes a non-transitory computer-readable storage medium storing a computer program. The computer program may be operated to enable a computer to execute part or all of the operations executed in the abovementioned methods. The computer program product may be a software installation package.

The operations of the method or algorithm described in the embodiments of the disclosure may be implemented in a hardware manner, or may be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The above is only the preferred embodiment of the disclosure and not intended to limit the disclosure. Any modifications, equivalent replacements, improvements and the like made within the spirit and principle of the disclosure shall fall within the scope of protection of the disclosure.

The invention claimed is:

1. A method for constructing a transverse topological relationship of lanes in a high-definition map, comprising steps of:
   acquiring data of lane groups from the high-definition map;
   for each lane group, sequentially extracting a shared boundary line group of two adjacent lanes and determining the number of parallel boundary line elements in the shared boundary line group;
   if the number of the parallel boundary line elements is 1, not generating a transverse topological relationship between the two adjacent lanes;
   if the number of the parallel boundary line elements is not 1, determining the number and types of boundary line units on the parallel boundary line elements;
   if the number of the boundary line units is 1, generating the transverse topological relationship between the two adjacent lanes according to a type of a shared boundary line; and
   if the number of the boundary line units is not 1, performing segmentation processing on the lane group along a lane direction according to a point, where switching between a solid line and a dotted line occurs, of the shared boundary line, and sequentially generating the transverse topological relationship between two adjacent lanes in each of segments, which are obtained by the segmentation processing on the lane group, according to a position of the point where switching between the solid line and dotted line occurs and the types of the boundary line units.

2. The method of claim 1, wherein performing segmentation processing on the lane group along the lane direction according to the point where switching between the solid line and dotted line occurs of the shared boundary line comprises:
   if a previous boundary line unit of the point where switching between the solid line and dotted line occurs of the shared boundary line is $B_1$, acquiring a distance dis between an ending point A of the boundary line unit $B_1$ and a starting point S of a shared boundary line L from the lane group data, the distance dis being an accumulated sum of shape point line segments between the point S and the point A;
   acquiring shape coordinate points of the shared boundary line L, and assuming a set of the vectorized coordinate points of the shared boundary line is $\{P_1, P_2, P_3 \ldots P_n\}$, forming, by every two adjacent coordinate points, a line segment to obtain line segments $L_1\{P_1, P_2\}$, $L_2\{P_2, P_3\}$, $L_3\{P_3, P_4\}$ . . . line segment $L_{n-1}\{P_{n-1}, P_n\}$ and calculating lengths $len_1, len_2, len_3, \ldots len_{n-1}$ of the line segments;
   calculating a specific line segment, where the ending point A is located, in a line segment set $L_1$, $L_2$, $L_3$, . . . $L_{n-1}$ according to the distance dis and the lengths $len_1, len_2, len_3, \ldots len_{n-1}$ of the line segments, A being denoted as located on a line segment $L_a$ and a starting point of $L_a$ being denoted as B;
   calculating a distance between the ending point A and B and calculating a position of the point A on the line segment $L_a$ according to the distance to acquire a coordinate of the point A;
   forming, by the point A and the point B, a line segment $L_{AB}$, drawing a perpendicular line $V_A$, that passes through the point A, of the line segment $L_{AB}$ and performing cutting processing on the lane group by use of the perpendicular line $V_A$; and
   repeating the steps to cut the lane group into multiple segments along the lane direction according to shared boundary line units.

3. The method of claim 2, after performing cutting processing on the lane group along the lane direction, further comprising: calculating an intersection point of the perpendicular line $V_A$ and a lane centerline $C_L$ on the left of the shared boundary line L, and an intersection point of the perpendicular line $V_A$ and a lane centerline $C_R$ on the right of the shared boundary line L.

4. The method of claim 3, wherein calculating the intersection point of the perpendicular line $V_A$ and the lane centerline $C_L$ on the left of the shared boundary line L and the intersection point of the perpendicular line $V_A$ and the lane centerline $C_R$ on the right of L comprises:
   acquiring shape coordinate points of the lane centerline $C_R$ on the right of the shared boundary line L, and assuming a set of the vectorized coordinate points of the lane centerline $C_R$ is $\{P_1', P_2', P_3' \ldots P_n'\}$, forming, by every two adjacent coordinate points, a line segment to obtain line segments $L_1'\{P_1', P_2'\}$, $L_2'\{P_2', P_3'\}$, $L_3'\{P_3', P_4'\}$ ... line segment $L_{n-1}'\{P_{n-1}', P_n'\}$;

determining whether the perpendicular line $V_A$ is intersected with a line segment set $\{L_1', L_2', L_3' \ldots L_{n-1}'\}$ or not, and calculating an intersection point, if there is more than one intersection point, extracting the intersection point closest to the point A, the intersection point being denoted as as a point C; and assuming the lane centerline on the left of the shared boundary line L is $C_L$, repeating the steps to calculate an intersection point D between the perpendicular line $V_A$ and $C_L$.

5. The method of claim 4, wherein sequentially generating the transverse topological relationship between two adjacent lanes in each of segments, which are obtained by the segmentation processing on the lane group, according to the position of the point where switching between the solid line and dotted line occurs and the types of the boundary line unit comprises:

for a point A where switching between a solid line and a dotted line occurs, determining a position of the point where the switching occurs at first;

if the point A is the first point of points where switching between a solid line and a dotted line occurs on the shared boundary line, a starting point of the lane centerline $C_R$ on the right being denoted as $S_R$ and a starting point of the lane centerline $C_L$ on the left being denoted as $S_L$, generating topological relationships between the point $S_R$ and the point D and between the point $S_L$ and the point C according to the type of the boundary line unit $B_1$;

if the point A is not the first point of points where switching between a solid line and a dotted line occurs on the shared boundary line, generating a topological relationship between an intersection point $C^{-1}$ of a perpendicular line $V_A^{-1}$ and the lane centerline $C_R$ on the right and the intersection point D of the perpendicular line $V_A$ and the lane centerline $C_L$ on the left and a topological relationship between an intersection point $D^{-1}$ of the perpendicular line $V_A^{-1}$ and the lane centerline $C_L$ on the left and the intersection point C of the perpendicular line $V_A$ and the lane centerline $C_R$ on the right according to the type of the boundary line unit $B_1$, $V_A^{-1}$ being a perpendicular line passing through a point, where switching between a solid line and a dotted line occurs and which is previous to the point A, and $V_A$ being a perpendicular line passing through the point A; and if the point A is the last point where switching between a solid line and a dotted line occurs on the shared boundary line, a boundary line unit next to the point A being denoted as $B_2$, a terminal point of the lane centerline $C_R$ on the right being denoted as $E_R$ and the starting point of the lane centerline $C_L$ on the left being denoted as $E_L$, generating a topological relationship between the intersection point C of the perpendicular line $V_A$ and the lane centerline $C_R$ on the right and the point $E_L$ and a topological relationship between the intersection point D of the perpendicular line $V_A$ and the lane centerline $C_L$ on the left and the point $E_R$ according to a type of the boundary line unit $B_2$.

6. The method of claim 1, wherein generating the transverse topological relationship between the two adjacent lanes in each segment of the lane group comprises:

(1) if the boundary line unit $B_1$ is blank, namely there is no lane line or $B_1$ is a dotted line, generating a transverse topological relationship that lane changing is allowed in the two lanes in a cutting region;

(2) if the boundary line unit $B_1$ is dotted on the left and solid on the right, generating a transverse topological relationship of changing from the left lane to the right lane in the cutting region;

(3) if the boundary line unit $B_1$ is solid on the left and dotted on the right, generating a transverse topological relationship of changing from the right lane to the left lane in the cutting region; and (4) under circumstance except for the three circumstances, not generating the transverse topological relationship between the two lanes in the cutting region.

7. A system for constructing a transverse topological relationship of lanes in a high-definition map, comprising:

a memory for storing instructions;

a processor configured to execute the instructions to perform steps of:

acquiring data of lane groups from the high-definition map;

for each lane group, sequentially extracting a shared boundary line group of two adjacent lanes and determining the number of parallel boundary line elements in the shared boundary line group;

if the number of the parallel boundary line elements is 1, not generating a transverse topological relationship between the two adjacent lanes;

if the number of the parallel boundary line elements is not 1, determining the number and types of boundary line units on the parallel boundary line elements;

if the number of the boundary line units is 1, generating the transverse topological relationship between the two adjacent lanes according to a type of a shared boundary line; and if the number of the boundary line units is not 1, performing segmentation processing on the lane group along a lane direction according to a point, where switching between a solid line and a dotted line occurs, of the shared boundary line, and sequentially generating the transverse topological relationship between two adjacent lanes in each of segments, which are obtained by the segmentation processing on the lane group, according to a position of the point where switching between the solid line and dotted line occurs and the types of the boundary line units.

8. The system of claim 7, wherein performing segmentation processing on the lane group along the lane direction according to the point where switching between the solid line and dotted line occurs of the shared boundary line comprises:

if a previous boundary line unit of the point where switching between the solid line and dotted line occurs of the shared boundary line is $B_1$, acquiring a distance dis between an ending point A of the boundary line unit $B_1$ and a starting point S of a shared boundary line L from the lane group data, the distance dis being an accumulated sum of shape point line segments between the point S and the point A;

acquiring shape coordinate points of the shared boundary line L, and assuming a set of the vectorized coordinate points of the shared boundary line is $\{P_1, P_2, P_3 \ldots P_n\}$, forming, by every two adjacent coordinate points, a line segment to obtain line segments $L_1\{P_1, P_2\}$, $L_2\{P_2, P_3\}$, $L_3\{P_3, P_4\}$ ... line segment $L_{n-1}\{P_{n-1}, P_n\}$ and calculating lengths $len_1, len_2, len_3, \ldots len_{n-1}$ of the line segments;

calculating a specific line segment, where the ending point A is located, in a line segment set $L_1$, $L_2$, $L_3$, ... $L_{n-1}$ according to the distance dis and the lengths $len_1$, $len_2$, $len_3$, ... $len_{n-1}$ of the line segments, A being denoted as located on a line segment $L_a$ and a starting point of $L_a$ being denoted as B;

calculating a distance between the ending point A and B and calculating a position of the point A on the line segment $L_a$ according to the distance to acquire a coordinate of the point A;

forming, by the point A and the point B, a line segment $L_{AB}$, drawing a perpendicular line $V_A$, that passes through the point A, of the line segment $L_{AB}$ and performing cutting processing on the lane group by use of the perpendicular line $V_A$; and repeating the steps to cut the lane group into multiple segments along the lane direction according to shared boundary line units.

9. The system of claim 8, after performing cutting processing on the lane group along the lane direction, further comprising: calculating an intersection point of the perpendicular line $V_A$ and a lane centerline $C_L$ on the left of the shared boundary line L, and an intersection point of the perpendicular line $V_A$ and a lane centerline $C_R$ on the right of the shared boundary line L.

10. The system of claim 9, wherein calculating the intersection point of the perpendicular line $V_A$ and the lane centerline $C_L$ on the left of the shared boundary line L and the intersection point of the perpendicular line $V_A$ and the lane centerline $C_R$ on the right of L comprises:

acquiring shape coordinate points of the lane centerline $C_R$ on the right of the shared boundary line L, and assuming a set of the vectorized coordinate points of the lane centerline $C_R$ is $\{P_1', P_2', P_3' \ldots P_n'\}$, forming, by every two adjacent coordinate points, a line segment to obtain line segments $L_1'\{P_1', P_2'\}$, $L_2'\{P_2', P_3'\}$, $L_3'\{P_3', P_4'\}$ ... line segment $L_{n-1}'\{P_{n-1}', P_n'\}$;

determining whether the perpendicular line $V_A$ is intersected with a line segment set $\{L_1', L_2', L_3' \ldots L_{n-1}'\}$ or not, and calculating an intersection point, if there is more than one intersection point, extracting the intersection point closest to the point A, the intersection point being denoted as as a point C; and assuming the lane centerline on the left of the shared boundary line L is $C_L$, repeating the steps to calculate an intersection point D between the perpendicular line $V_A$ and $C_L$.

11. The system of claim 10, wherein sequentially generating the transverse topological relationship between two adjacent lanes in each of segments, which are obtained by the segmentation processing on the lane group, according to the position of the point where switching between the solid line and dotted line occurs and the types of the boundary line unit comprises:

for a point A where switching between a solid line and a dotted line occurs, determining a position of the point where the switching occurs at first;

if the point A is the first point of points where switching between a solid line and a dotted line occurs on the shared boundary line, a starting point of the lane centerline $C_R$ on the right being denoted as $S_R$ and a starting point of the lane centerline $C_L$ on the left being denoted as $S_L$, generating topological relationships between the point $S_R$ and the point D and between the point $S_L$ and the point C according to the type of the boundary line unit $B_1$;

if the point A is not the first point of points where switching between a solid line and a dotted line occurs on the shared boundary line, generating a topological relationship between an intersection point $C^{-1}$ of a perpendicular line $V_A^{-1}$ and the lane centerline $C_R$ on the right and the intersection point D of the perpendicular line $V_A$ and the lane centerline $C_L$ on the left and a topological relationship between an intersection point $D^{-1}$ of the perpendicular line $V_A^{-1}$ and the lane centerline $C_L$ on the left and the intersection point C of the perpendicular line $V_A$ and the lane centerline $C_R$ on the right according to the type of the boundary line unit $B_1$, $V_A^{-1}$ being a perpendicular line passing through a point, where switching between a solid line and a dotted line occurs and which is previous to the point A, and $V_A$ being a perpendicular line passing through the point A; and if the point A is the last point where switching between a solid line and a dotted line occurs on the shared boundary line, a boundary line unit next to the point A being denoted as $B_2$, a terminal point of the lane centerline $C_R$ on the right being denoted as $E_R$ and the starting point of the lane centerline $C_L$ on the left being denoted as $E_L$, generating a topological relationship between the intersection point C of the perpendicular line $V_A$ and the lane centerline $C_R$ on the right and the point $E_L$ and a topological relationship between the intersection point D of the perpendicular line $V_A$ and the lane centerline $C_L$ on the left and the point $E_R$ according to a type of the boundary line unit $B_2$.

12. The system of claim 7, wherein generating the transverse topological relationship between the two adjacent lanes in each segment of the lane group comprises:

(1) if the boundary line unit $B_1$ is blank, namely there is no lane line or $B_1$ is a dotted line, generating a transverse topological relationship that lane changing is allowed in the two lanes in a cutting region;

(2) if the boundary line unit $B_1$ is dotted on the left and solid on the right, generating a transverse topological relationship of changing from the left lane to the right lane in the cutting region;

(3) if the boundary line unit $B_1$ is solid on the left and dotted on the right, generating a transverse topological relationship of changing from the right lane to the left lane in the cutting region; and (4) under circumstance except for the three circumstances, not generating the transverse topological relationship between the two lanes in the cutting region.

13. A non-transitory memory having stored thereon a computer program configured to implement the method for constructing a transverse topological relationship of lanes in a high-definition map, the method comprising:

acquiring data of lane groups from the high-definition map;

for each lane group, sequentially extracting a shared boundary line group of two adjacent lanes and determining the number of parallel boundary line elements in the shared boundary line group;

if the number of the parallel boundary line elements is 1, not generating a transverse topological relationship between the two adjacent lanes;

if the number of the parallel boundary line elements is not 1, determining the number and types of boundary line units on the parallel boundary line elements;

if the number of the boundary line units is 1, generating the transverse topological relationship between the two adjacent lanes according to a type of a shared boundary line; and if the number of the boundary line units is not 1, performing segmentation processing on the lane group along a lane direction according to a point, where switching between a solid line and a dotted line occurs, of the shared boundary line, and sequentially generating the transverse topological relationship between two adjacent lanes in each of segments, which are obtained by the segmentation processing on the lane group, according to a position of the point where switching between the solid line and dotted line occurs and the types of the boundary line units.

14. The memory of claim 13, wherein performing segmentation processing on the lane group along the lane direction according to the point where switching between the solid line and dotted line occurs of the shared boundary line comprises:

if a previous boundary line unit of the point where switching between the solid line and dotted line occurs of the shared boundary line is $B_1$, acquiring a distance dis between an ending point A of the boundary line unit $B_1$ and a starting point S of a shared boundary line L from the lane group data, the distance dis being an accumulated sum of shape point line segments between the point S and the point A;

acquiring shape coordinate points of the shared boundary line L, and assuming a set of the vectorized coordinate points of the shared boundary line is $\{P_1, P_2, P_3 \ldots P_n\}$, forming, by every two adjacent coordinate points, a line segment to obtain line segments $L_1\{P_1, P_2\}$, $L_2\{P_2, P_3\}$, $L_3\{P_3, P_4\}$ ... line segment $L_{n-1}\{P_{n-1}, P_n\}$ and calculating lengths $len_1, len_2, len_3, \ldots len_{n-1}$ of the line segments;

calculating a specific line segment, where the ending point A is located, in a line segment set $L_1, L_2, L_3, \ldots L_{n-1}$ according to the distance dis and the lengths $len_1, len_2, len_3, len_{n-1}$ of the line segments, A being denoted as located on a line segment $L_a$ and a starting point of $L_a$ being denoted as B;

calculating a distance between the ending point A and B and calculating a position of the point A on the line segment $L_a$ according to the distance to acquire a coordinate of the point A;

forming, by the point A and the point B, a line segment $L_{AB}$, drawing a perpendicular line $V_A$, that passes through the point A, of the line segment $L_{AB}$ and performing cutting processing on the lane group by use of the perpendicular line $V_A$; and repeating the steps to cut the lane group into multiple segments along the lane direction according to shared boundary line units.

15. The memory of claim 14, after performing cutting processing on the lane group along the lane direction, further comprising: calculating an intersection point of the perpendicular line $V_A$ and a lane centerline $C_L$ on the left of the shared boundary line L, and an intersection point of the perpendicular line $V_A$ and a lane centerline $C_R$ on the right of the shared boundary line L.

16. The memory of claim 15, wherein calculating the intersection point of the perpendicular line $V_A$ and the lane centerline $C_L$ on the left of the shared boundary line L and the intersection point of the perpendicular line $V_A$ and the lane centerline $C_R$ on the right of L comprises:

acquiring shape coordinate points of the lane centerline $C_R$ on the right of the shared boundary line L, and assuming a set of the vectorized coordinate points of the lane centerline $C_R$ is $\{P_1', P_2', P_3' \ldots P_n'\}$, forming, by every two adjacent coordinate points, a line segment to obtain line segments $L_2'\{P_1', P_2'\}$, $L_2'\{P_2', P_3'\}$, $L_3'\{P_3', P_4'\}$ ... line segment $L_{n-1}'\{P_{n-1}', P_n'\}$;

determining whether the perpendicular line $V_A$ is intersected with a line segment set $\{L_1', L_2', L_3' \ldots L_{n-1}'\}$ or not, and calculating an intersection point, if there is more than one intersection point, extracting the intersection point closest to the point A, the intersection point being denoted as as a point C; and assuming the lane centerline on the left of the shared boundary line L is $C_L$, repeating the steps to calculate an intersection point D between the perpendicular line $V_A$ and $C_L$.

17. The memory of claim 16, wherein sequentially generating the transverse topological relationship between two adjacent lanes in each of segments, which are obtained by the segmentation processing on the lane group, according to the position of the point where switching between the solid line and dotted line occurs and the types of the boundary line unit comprises:

for a point A where switching between a solid line and a dotted line occurs, determining a position of the point where the switching occurs at first;

if the point A is the first point of points where switching between a solid line and a dotted line occurs on the shared boundary line, a starting point of the lane centerline $C_R$ on the right being denoted as $S_R$ and a starting point of the lane centerline $C_L$ on the left being denoted as $S_L$, generating topological relationships between the point $S_R$ and the point D and between the point $S_L$ and the point C according to the type of the boundary line unit $B_1$;

if the point A is not the first point of points where switching between a solid line and a dotted line occurs on the shared boundary line, generating a topological relationship between an intersection point $C^{-1}$ of a perpendicular line $V_A^{-1}$ and the lane centerline $C_R$ on the right and the intersection point D of the perpendicular line $V_A$ and the lane centerline $C_L$ on the left and a topological relationship between an intersection point $D^{-1}$ of the perpendicular line $V_A^{-1}$ and the lane centerline $C_L$ on the left and the intersection point C of the perpendicular line $V_A$ and the lane centerline $C_R$ on the right according to the type of the boundary line unit $B_1$, $V_A^{-1}$ being a perpendicular line passing through a point, where switching between a solid line and a dotted line occurs and which is previous to the point A, and $V_A$ being a perpendicular line passing through the point A; and if the point A is the last point where switching between a solid line and a dotted line occurs on the shared boundary line, a boundary line unit next to the point A being denoted as $B_2$, a terminal point of the lane centerline $C_R$ on the right being denoted as $E_R$ and the starting point of the lane centerline $C_L$ on the left being denoted as $E_L$, generating a topological relationship between the intersection point C of the perpendicular line $V_A$ and the lane centerline $C_R$ on the right and the point $E_L$ and a topological relationship between the intersection point D of the perpendicular line $V_A$ and the lane centerline $C_L$ on the left and the point $E_R$ according to a type of the boundary line unit $B_2$.

18. The memory of claim 13, wherein generating the transverse topological relationship between the two adjacent lanes in each segment of the lane group comprises:

(1) if the boundary line unit $B_1$ is blank, namely there is no lane line or $B_1$ is a dotted line, generating a transverse topological relationship that lane changing is allowed in the two lanes in a cutting region;
(2) if the boundary line unit $B_1$ is dotted on the left and solid on the right, generating a transverse topological relationship of changing from the left lane to the right lane in the cutting region;
(3) if the boundary line unit $B_1$ is solid on the left and dotted on the right, generating a transverse topological relationship of changing from the right lane to the left lane in the cutting region; and
(4) under circumstance except for the three circumstances, not generating the transverse topological relationship between the two lanes in the cutting region.

* * * * *